(12) United States Patent
Uemura et al.

(10) Patent No.: US 7,473,306 B2
(45) Date of Patent: Jan. 6, 2009

(54) AIR CLEANER

(75) Inventors: Soichi Uemura, Hamamatsu (JP); Tetsuo Akiyama, Hamamatsu (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 431 days.

(21) Appl. No.: 11/447,150

(22) Filed: Jun. 6, 2006

(65) Prior Publication Data

US 2006/0272509 A1 Dec. 7, 2006

(30) Foreign Application Priority Data

Jun. 7, 2005 (JP) .............................. 2005-167260

(51) Int. Cl.
*F02M 35/02* (2006.01)
*B01D 53/02* (2006.01)

(52) U.S. Cl. .......................................... 96/134; 55/511

(58) Field of Classification Search .................. 95/146; 96/134, 147; 55/385.3, 495, 511; 123/518
See application file for complete search history.

(56) References Cited

U.S. PATENT DOCUMENTS 6,383,268 B2 * 5/2002 Oda .............................. 96/134

2005/0145224 A1 * 7/2005 Zulauf et al. ................. 123/518
2007/0022880 A1 * 2/2007 Mizutani et al. ............... 96/136
2007/0113740 A1 * 5/2007 Oda .............................. 96/134

FOREIGN PATENT DOCUMENTS

| JP | 2000-186635 | * | 7/2000 |
| JP | 2001-336454 | | 12/2001 |
| JP | 2002-266713 | | 9/2002 |

* cited by examiner

*Primary Examiner*—Frank M Lawrence
(74) *Attorney, Agent, or Firm*—Young & Thompson

(57) ABSTRACT

An air cleaner is provided with a housing, a filter element disposed inside the housing for filtrating air introduced into the housing, and an adsorption element disposed in the housing for adsorbing gasified fuel in the housing, the adsorption element including an adsorbing member adsorbing gasified fuel and a frame surrounding the adsorbing member to hold the adsorbing member. The air cleaner further includes a plurality of first fusing projections projecting from one surface of the frame, a plurality of ribs formed to an inner surface of the housing so as to project therefrom and extending laterally and transversely to cross each other, and a plurality of second fusing projections formed to the inner surface of the housing at positions corresponding to the location of the first fusing projections formed to the frame of the adsorption element, each of the second projections being surrounded by a pair of crossing ribs.

6 Claims, 5 Drawing Sheets

AIR CLEANER

BACKGROUND OF THE INVENTION

1. Field of the Invention

The present invention relates to an air cleaner for filtrating an air flowing in an intake system of an internal combustion engine.

2. Related Art

In an internal combustion engine, there may cause such a case as that an evaporated and gasified fuel flows inside an air cleaner from an engine side. In a conventional art, in order to adsorb such gasified air, an adsorbing member (or adsorbent) is disposed in the air cleaner in addition to a filter element.

For example, in an air cleaner disclosed in Japanese Patent Unexamined Application (KOKAI) Publication No. 2001-336454, a plurality of ribs are formed, so as to extend in parallel, to an inner surface of a housing of the air cleaner, and the adsorbing member is disposed between these ribs.

Furthermore, an air cleaner disclosed in Japanese Patent Unexamined Application (KOKAI) Publication No. 2002-266731 is provided with a filter element so as to divide the inside of the housing into a dirty side and a clean side. In the clean side, a plate-shaped adsorption element is arranged to be parallel with the filter element. An inner flanged portion extending toward the center side of the housing is formed along the entire inner peripheral surface of the housing. A pin for fusing is formed on one surface side of this inner flanged portion. The adsorption element has a frame to its peripheral edge portion, and an insertion hole is formed to the frame so as to conform with the fusing pin formed to the inner flanged portion.

The adsorption element is mounted to the housing by inserting the fusing pin into the insertion hole formed to the frame and crushing, by heating, the front end of the pin projecting over the frame surface to thereby calk the frame.

However, in the air cleaner disclosed in the publication 1, it is obliged to manufacture the adsorbing member specifically for such air-cleaner, and accordingly, the adsorbing member is not suitable for the general use. In addition, the adsorbing member may come off from the inner surface of the air cleaner if some countermeasure may not be considered.

On the other hand, in the air cleaner disclosed in the publication 2, at the time of attaching the adsorption element, it may be adversely influenced with heat for heating the pin. In addition, at the heating time of the pin, there may exist a fear of generation of welding residue from a front end of the fused pin, and moreover, in the air cleaner shown in this publication 2, since the adsorption element covers the whole air passage, air passing resistance will be increased, thus being inconvenient.

Furthermore, it is necessary to additionally take countermeasure to noise radiated from the air cleaner.

SUMMARY OF THE INVENTION

The present invention has been conceived in consideration of the circumstances mentioned above and an object of the present invention is to provide an air cleaner provided with an adsorption element capable of reducing a radiation noise without reducing quality and performance of the air cleaner.

This and other objects can be achieved according to the present invention by providing, in one aspect, an air cleaner comprising: a housing; a filter element disposed inside the housing and configured to filtrate air introduced into the housing; an adsorption element disposed in the housing and configured to adsorb gasified fuel evaporated and flowed in the housing, the adsorption element including an adsorbing member adsorbing the gasified fuel and a frame surrounding the adsorbing member so as to hold the adsorbing member; a plurality of first fusing projections projecting from one surface of the frame; a plurality of ribs formed to an inner surface of the housing so as to project therefrom and extending laterally and transversely so as to cross each other; and a plurality of second fusing projections formed to the inner surface of the housing at positions corresponding to the location of the first fusing projections formed to the frame of the adsorption element, each of the second projections being surrounded by a pair of crossing ribs, wherein the adsorption element is mounted to the inner surface of the housing by abutting the first fusing projections against the second fusing projections, respectively, and carrying out an oscillation fusing process.

In a preferred embodiment of this aspect, it is desirable that a portion of the inner surface of the housing opposing to the frame of the adsorption element entirely projects inside the housing or a portion inside the ribs surrounding the periphery of the second fusing projection projects partially inside the housing.

It is also desirable that the filter element is disposed inside the housing so as to divide the inner space of the housing into a dirty side and a clean side and the adsorption element is disposed in the clean side.

In another aspect of the present invention, there is also provided an air cleaner comprising: a housing; a filter element disposed inside the housing and configured to filtrate air introduced into the housing; an adsorption element disposed in the housing and configured to adsorb gasified fuel evaporated and flowed in the housing, the adsorption element including an adsorbing member adsorbing gasified fuel and a frame surrounding the adsorbing member so as to hold the adsorbing member; a first fusing projections projecting from one surface of the frame; a plurality of ribs formed to an inner surface of the housing so as to project therefrom and extending laterally and transversely so as to cross each other; an attachment portion having a shape corresponding to the shape of the frame in an area at which the ribs are formed; and wall sections formed to both side edges of the attachment portion along an extending direction thereof so as to project therefrom, wherein the adsorption element is mounted to the inner surface of the housing by abutting the first fusing projection against the attachment portion and carrying out an oscillation fusing process.

In this aspect, it is desirable that the attachment portion projects together with the wall sections inward the housing from the inner surface of the housing. It is also desirable that the filter element is disposed inside the housing so as to divide the inner space of the housing into a dirty side and a clean side and the adsorption element is disposed in the clean side.

According to the air cleaner of present invention of the aspects mentioned above, since the adsorption element is mounted along the inner surface of the air cleaner housing, air passing resistance of the air passing the inside of the air cleaner can be prevented from increasing and, moreover, the air flow is not disturbed, thus effectively adsorbing carbon or like contained in the air.

Since the oscillation fusing is adopted to firmly attach the adsorption element, the adsorption element can be firmly fixed to the housing.

In addition, the formation of the ribs extending laterally and transversely so as to intersect each other can effectively prevent the generation of radiant noise.

In the first aspect of the present invention, the first fusing projection is surrounded by the ribs at the oscillation fusing process, so that burrs generated inside the housing can be prevented by the ribs from scattering.

In the second aspect of the present invention, the ribs can attain the silencing function to the radiant noise, and the scattering of the burr can be prevented by the formation of the wall sections to the attachment portion, thus protecting the burr from entering into the engine.

Since the adsorption element is disposed in the clean side of the housing, the gasified fuel from the engine can be preliminarily adsorbed by the adsorption element to thereby prevent the gasified fuel from entering into the dirty side.

The nature and further characteristic features of the present invention will be made more clear from the following descriptions made with reference to the accompanying drawings.

DESCRIPTION OF THE PREFERRED EMBODIMENT

Figure 1:
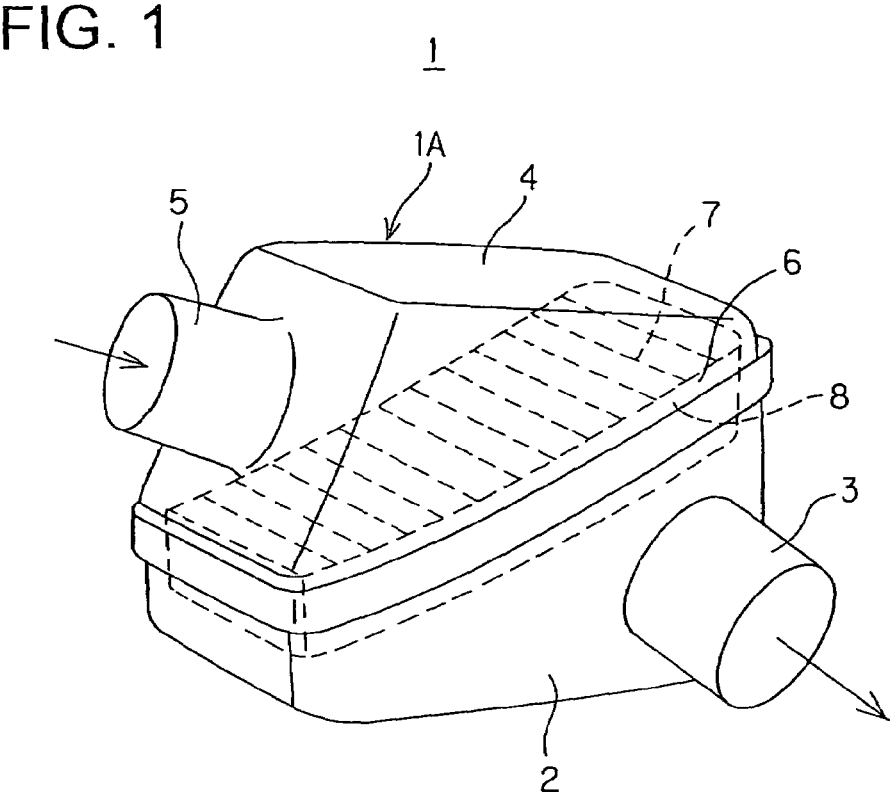
FIG. 1 is an illustrated perspective view of an air cleaner according to one embodiment of the present invention.

A first embodiment of the present invention will be described hereunder with reference to FIGS. 1 to 4, in which terms "upper", "lower", "right", "left" and the like terms are used with reference to the illustration of the drawings or in a generally usable state of an air cleaner.

An air cleaner 1 of this embodiment has a housing 1A provided with a case 2 having an upper surface opened and a cover 4 having a lower surface opened, the opened lower surface of the cover 4 being placed on the opened upper surface of the case 2 to thereby constitute the housing 1A.

The air cleaner 1 also has a filter element 6 disposed inside the housing 1A in a manner such that the filter element 6 is sandwiched between the upper surface of the case 2 and the lower surface of the cover 4. This filter element 6 is composed of a pleated filter (filtrating) member 7 and a frame member 8 surrounding the outer peripheral edge of the filter member 7 so as to support it. As not shown in detail in FIG. 1, a packing is applied entirely to the outer peripheral edge of the frame member 8, and accordingly, the filter element 6 is attached to the housing 1A by clamping the packing between the upper surface of the case 2 and the lower surface of the cover 4. According to such attachment, the filter element 6 sections the inside of the housing 1A into a case side and a cover side.

In the air cleaner 1 according to the present invention mentioned above, an air introducing (entrance) port 5 for introducing air into the housing 1A is formed to the cover 4 and an air exhaust port 3 is also formed to the case 2 so as to discharge the filtrated air outside the housing 1A. That is, the air introduced into the housing 1A through the air introducing port 5 is filtrated by the filter element 6 and then discharged therefrom through the exhaust port 3. Accordingly, the cover side in the housing 1A may be called "dirty side", and on the contrary, the case side may be called "clean side".

Furthermore, in the air cleaner 1, an adsorption element 10 for adsorbing a gasified fuel from an engine is provided for the case 2 as the clean side.

Figure 2:
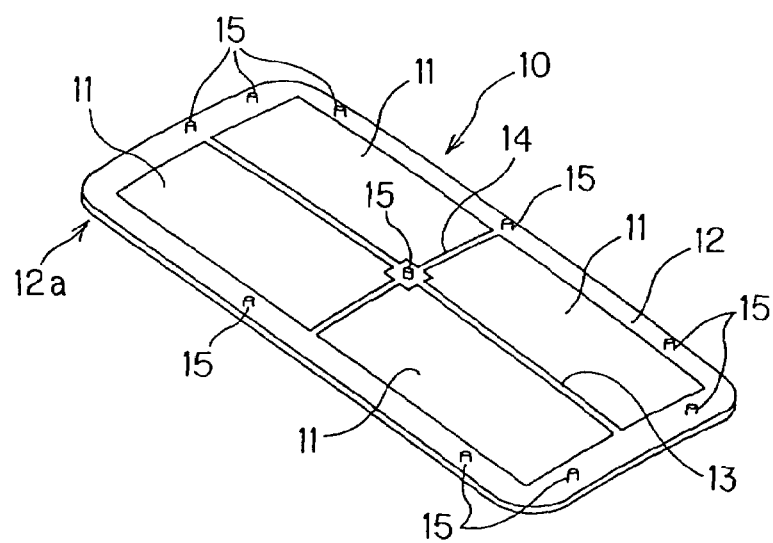
FIG. 2 is a perspective view of an adsorption element as viewed from the rear side thereof.
Figure 3:
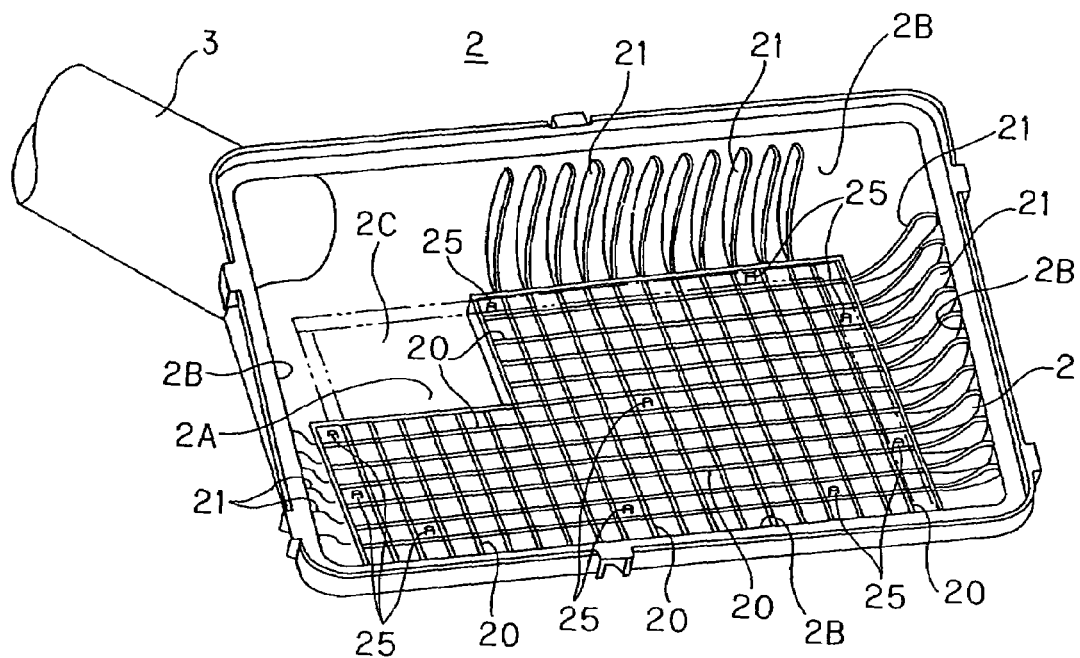
FIG. 3 is a perspective view showing an inner structure of a case constituting a housing of the air cleaner of FIG. 1.
Figure 4:
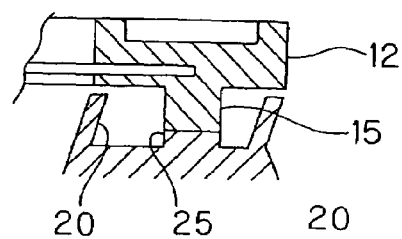
FIG. 4 is an illustrated sectional view showing an abutting condition of first and second fusing projections.

FIGS. 2 to 4 shows the details of the adsorption element 10 and an inner structure of the case 2.

The adsorption element 10 is composed of a flat adsorbing member (adsorbent) 11 having rectangular shape and a frame 12 surrounding an outer periphery of the adsorbing member 11 and supporting the same. This frame 12 is formed, in a rectangular shape, by a flat resin member having a constant width. In this frame 12, reinforcing members 13 and 14 are disposed in a manner such that the reinforcing members 13 and 14 connect inner central portions of the longitudinal sides and inner central portions of the lateral sides, respectively, and perpendicularly intersect each other at their central portions. Thus, the inside area of the frame 12 is divided into four sections by the reinforcing members 13 and 14.

The adsorbing members 11 are disposed in these divided four sections, respectively, and the peripheral edge portions of the adsorbing members 11 are supported by the inner edge of the frame 12 and the reinforcing members 13 and 14.

Furthermore, as shown in FIG. 2, a plurality of projections 15 are formed to the rear surface of the frame 12 such that the fusing projections 15 are not formed at an area around one corner portion 12a of the frame 12. A first fusing projection 15 is further formed to the central intersecting portion of the reinforcing members 13 and 14.

Although in the illustrated embodiment, the adsorption element 10 has a rectangular shape, the present invention is not limited to such shape and the adsorption element 10 may have an outer shape corresponding to the shape of the housing 1A.

With reference to FIG. 3 showing the details of the inner structure of the case 2, a plurality of ribs 20 projecting toward the inside of the housing 1A and extending longitudinally and laterally so as to intersect each other. These ribs 20 are formed at almost all the area of a bottom surface portion 2A of the case 2 except for a portion 2C near the entrance of the exhaust port 3, and this portion 2C formed with no rib 20 has a rectangular shape. Furthermore, ribs 21 extending vertically are formed to the inner surface of the side surfaces 2B of the case 2.

The ribs 20 formed to the inner surface of the case 2 serves as silencer ribs 20, and though not shown in FIG. 3, other silencer ribs like the ribs 20 are also formed to the inner surface of the cover 4.

A plurality of projections 25 for fusing are also formed to the inner surface of the bottom surface portion 2A of the case 2 at the area in which the ribs 20 are formed. These fusing projections 25 are portions abutting against the first projections 15 formed to the frame 12 of the adsorption element 10 and are formed to the areas corresponding to the frame 12 when the adsorption element 10 is mated with the inner surface of the bottom surface portion 2A of the case 2, these areas being shown with two-dot lines in FIG. 3.

As clearly shown in FIG. 3, each second projection 25 is surrounded by a pair of adjacent longitudinal and lateral ribs 20.

The adsorption element 10 and the case 2 of the structures mentioned above are combined in a manner that the adsorption element 10 is oscillation-fused to the inner surface of the case 2, and at the time of oscillation fusing, the rear surface of the adsorption element 10 is overlapped with the inner surface of the bottom portion 2A of the case 2. In this time, the adsorption element 10 is mounted to the inner surface of the case 2, as shown in FIG. 4, after the positional alignment of the first fusing projections 15 on the second fusing projections 25 formed to the case.

In the abutting state of the first fusing projections 15 against the second fusing projections 25, the frame 12 of the adsorption element 10 is pressed against the case 2 while finely oscillating the adsorption element 10 in the lateral direction with respect to the case 2. According to such oscillation motion, friction heat is generated between the first and second projections 15 and 25, which are then fused together. When the oscillation fusing is carried out, burr is generated from a portion to be fused. However, in the air cleaner 1 of the present embodiment, since the second projection 25 to be fused is surrounded by the ribs 20, the thus generated burr can be surely prevented from scattering therefrom.

With reference to FIG. 3, as mentioned before, any rib 20 is not formed at the area 2C near the entrance of the exhaust port 3, so that if the second projection 25 is formed to this area 2C and the oscillation fusing is effected, generated burr will be scattered inside the case 2. In order to obviate such defect from causing, any second projection 25 is not formed to this area 2C. In addition, any first fusing projection 15 is not formed to a portion near the corner portion 12a of the frame 2 corresponding to such position.

Figure 5:
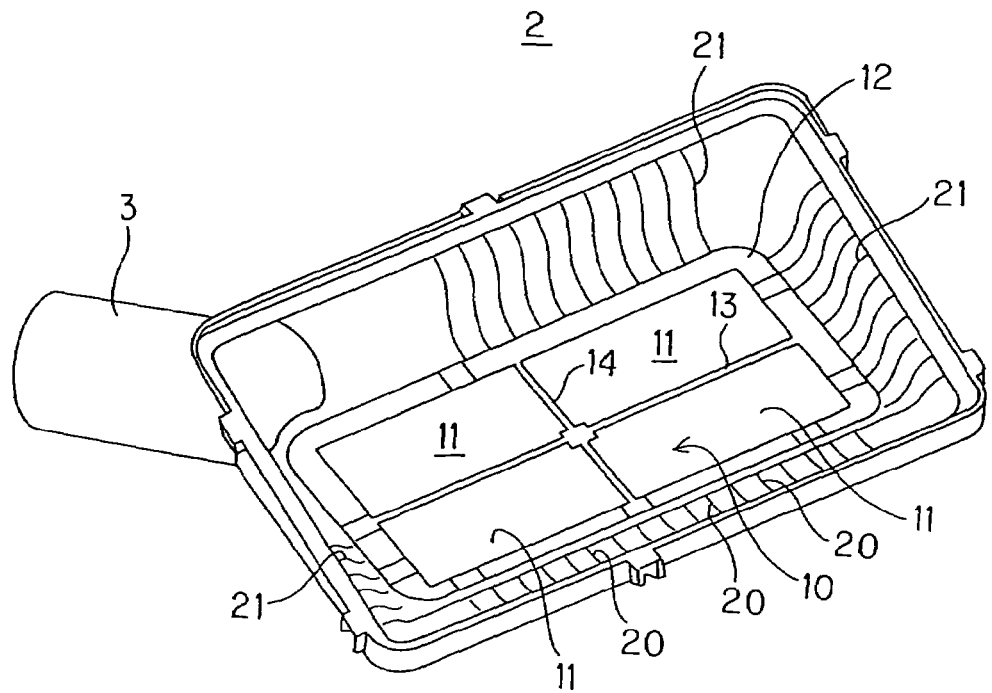
FIG. 5 is a perspective view showing an inner surface of the case in which the adsorption element is attached to the case.

FIG. 5 shows a state that the adsorption element 10 is fused and fixed to the case 2 through the oscillation fusing process of the characters mentioned above. With reference to FIG. 5, the adsorption element 10 is mounted to the case 2 so as to be along the inner surface of the case 2. Accordingly, the adsorption element 10 can effectively adsorb gasified fuel from the engine, without disturbing the air flow inside the air cleaner 1, while preventing the air flow resistance from increasing.

Figure 6:
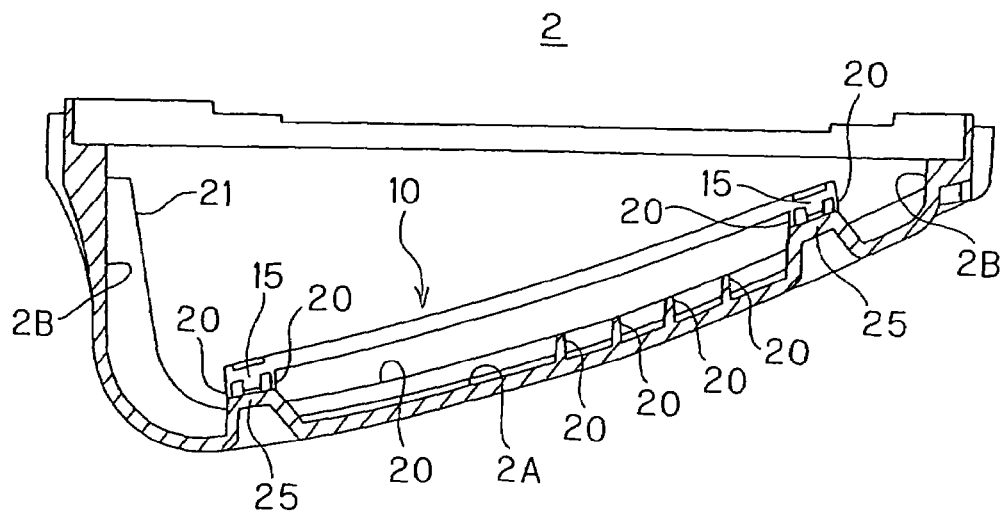
FIG. 6 is a sectional view of another example of the case.

Furthermore, as shown in FIG. 6, the second fusing projections 25 may be formed so as to project from the inner surface of the case 2. Further, as shown in FIG. 3, in the case when the portions at which the second fusing projections 25 are formed to be in the same level as the other portion of the inner surface of the case 2, supposing that the adsorption element has a flexed portion, the rear surfaces of the frame 12 and the adsorbing member 11 will be scrubbed with the ribs 20 and hence damaged at the time of the oscillation fusing process.

As in the embodiment of FIG. 6, the arrangement in which the second fusing projections 25 project from the inner surface of the case 2 can effectively prevent such defect or inconvenience mentioned above from causing.

Further, in the example of FIG. 5, the surface of the adsorption element 10 opposing to the inner surface of the case 2 is shut out from an inner space in the case 2 by the ribs 20. For this reason, the surface of the adsorbing member 11 opposing to the inner surface of the case 2 is not effectively utilized. On the contrary, in the example shown in FIG. 6, a space is created between the adsorption element 10 and the inner surface of the case 2, and accordingly, the surface of the adsorbing member 11 opposing to the case 2 can contribute to effective adsorption of the gasified fuel.

The second embodiment of the present invention will be described hereunder with reference to FIGS. 7 and 8.

Figure 7:
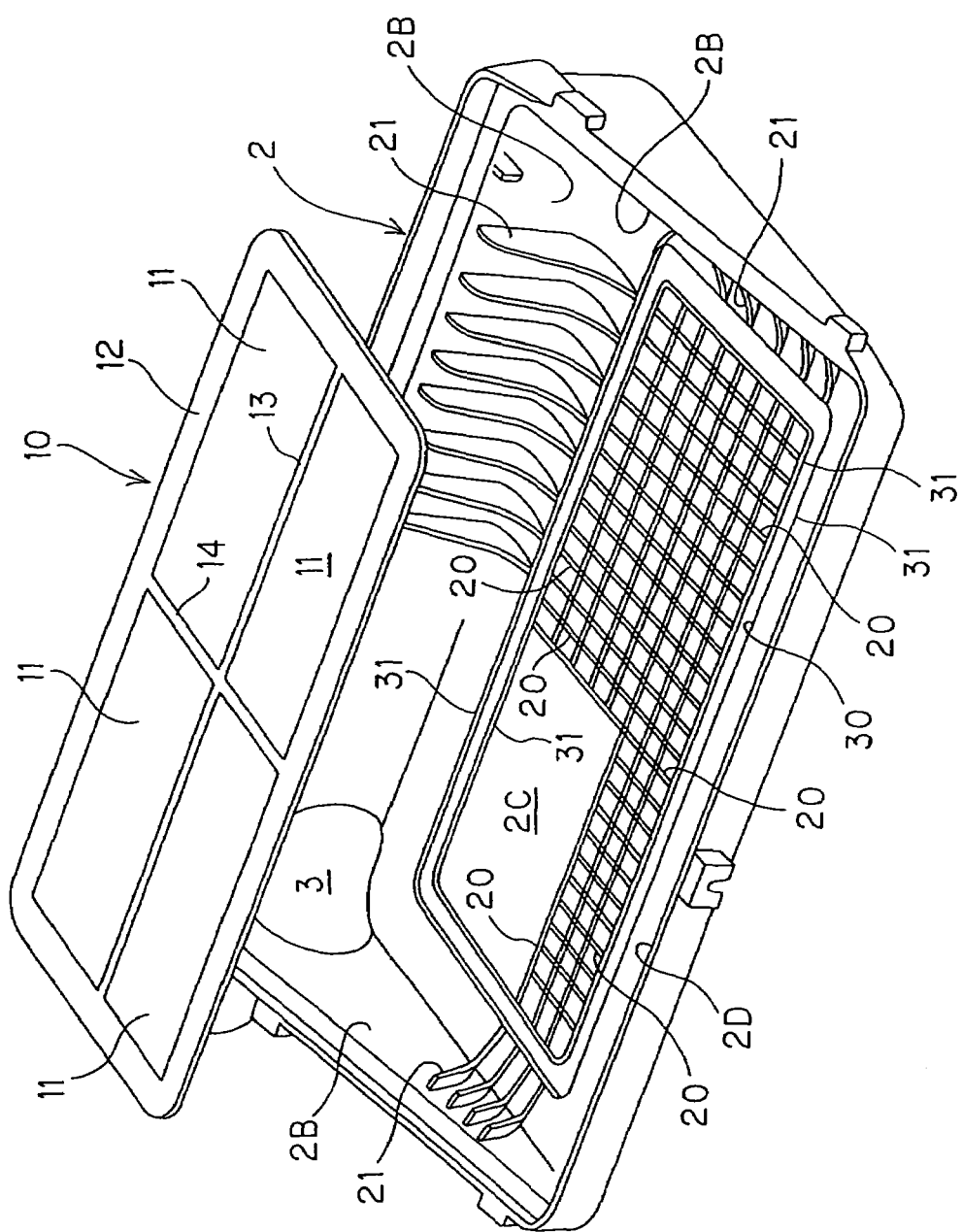
FIG. 7 is a perspective view of an air cleaner and an adsorption element according to another embodiment of the present invention.

In the air cleaner 1 shown in FIG. 7, the rear surface of the frame 12 of the adsorption element 10 is entirely oscillation-fused to the inner surface of the case 2. The case 2 of the air cleaner 1 of this second embodiment has a basic structure substantially the same as that of the case 2 of the air cleaner 1 of the first embodiment, so that like reference numerals are added to elements or portions corresponding to those in the first embodiment and description thereof will be omitted herein.

In the case 2 of this embodiment, a plurality of ribs 20 extending laterally and transversely are formed to the inner surface of the bottom surface portion 2A so as to project therefrom. A rectangular area 2C at which no rib is formed is formed near the exhaust port 3. Further, in the area at which the ribs are formed, an attachment portion 30 having a predetermined width is mounted in a rectangular shape. This attachment portion 30 is a portion to which the frame 12 of the adsorption element 10 is oscillation-fused, and the dimension of the attachment portion 30 corresponds to the dimension of the frame 12 so that the adsorption element 10 is precisely mated with the frame 12 when applied thereto. The attachment portion 30 has outer and inner peripheral edges, around which wall sections 31 are entirely formed so as to protect burrs, which may be generated at the oscillation fusing operation, from scattering.

Figure 8:
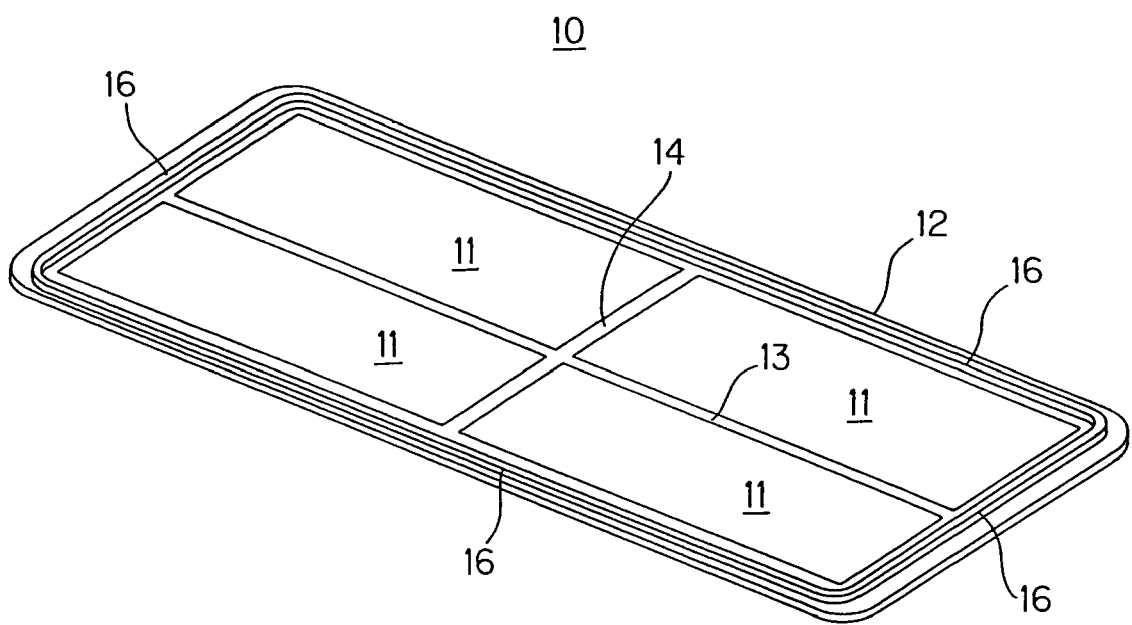
FIG. 8 is a perspective view of the adsorption element as viewed from the rear side thereof of the embodiment shown in FIG. 7.

With reference to FIG. 8, a first fusing projection 16 is formed to the entire peripheral portion of the rear surface of the frame 12 of the adsorption element 10 at substantially the central portion in the width direction thereof. In an alternation, a plurality of fine tubular projections may be intermittently provided in the circumferential direction of the frame as in the first embodiment.

According to the case 2 and the adsorption element 10 of the air cleaner of the structure mentioned above, the first fusing projection 16 formed to the frame 12 of the adsorption element 10 abuts against the attachment portion 30 and the adsorption element 10 is pressed against the case 2. In this state, when the adsorption element 10 is finely oscillated with respect to the case 2, the adsorption element and the case 2 can be oscillation-fused. Although the burr is generated at this oscillation operation, the burr can be prevented from scattering inside the case 2 by the wall sections 31 formed to the outer and inner peripheral edges of the attachment portion 30, thus being advantageous.

Furthermore, in this embodiment, the fusing projection may be formed to the attachment portion 30, and in such case, it will be necessary for this fusing projection to have an outer shape or size substantially the same as that of the first fusing projection 16 formed to the frame 12 of the adsorption element 10 so as to properly abut thereagainst.

In addition, the attachment portion 30 may be projected together with the wall sections 31 toward the inside of the air cleaner 1 from the inner surface of the case 2.

It is further to be noted that the present invention is not limited to the described embodiment and many other changes and modifications may be made without departing from the scopes of the appended claims.

What is claimed is:

1. An air cleaner comprising:
   a housing;
   a filter element disposed inside the housing and configured to filtrate air introduced into the housing;
   an adsorption element disposed in the housing and configured to adsorb gasified fuel evaporated and flowed in the housing, said adsorption element including an adsorbing member adsorbing the gasified fuel and a frame surrounding the adsorbing member so as to hold the adsorbing member;
   a plurality of first fusing projections projecting from one surface of the frame;
   a plurality of ribs formed to an inner surface of the housing so as to project therefrom and extending laterally and transversely to cross each other; and a plurality of second fusing projections formed to the inner surface of the housing at positions corresponding to the location of the first fusing projections formed to the frame of the adsorption element, each of said second projections being surrounded by a pair of crossing ribs, wherein the adsorption element is mounted to the inner surface of the housing by abutting the first fusing projections against the second fusing projections, respectively, and carrying out an oscillation fusing process.

2. The air cleaner according to claim 1, wherein a portion of the inner surface of the housing opposing to the frame of the adsorption element entirely projects inside the housing or a portion inside the ribs surrounding the periphery of the second fusing projection projects partially inside the housing.

3. The air cleaner according to claim 1, wherein the filter element is disposed inside the housing so as to divide the inner space of the housing into a dirty side and a clean side and the adsorption element is disposed in the clean side.

4. An air cleaner comprising:

a housing;

a filter element disposed inside the housing and configured to filtrate air introduced into the housing;

an adsorption element disposed in the housing and configured to adsorb gasified fuel evaporated and flowed in the housing, said adsorption element including an adsorbing member adsorbing the gasified fuel and a frame surrounding the adsorbing member so as to hold the adsorbing member;

a first fusing projections projecting from one surface of the frame;

a plurality of ribs formed to an inner surface of the housing so as to project therefrom and extending laterally and transversely to cross each other;

an attachment portion having a shape corresponding to the shape of the frame in an area at which the ribs are formed; and wall sections formed to both side edges of the attachment portion along an extending direction thereof so as to project therefrom, wherein the adsorption element is mounted to the inner surface of the housing by abutting the first fusing projection against the attachment portion and carrying out an oscillation fusing process.

5. The air cleaner according to claim 4, wherein the attachment portion projects together with the wall sections inward of the housing from the inner surface of the housing.

6. The air cleaner according to claim 4, wherein the filter element is disposed inside the housing so as to divide the inner space of the housing into a dirty side and a clean side and the adsorption element is disposed in the clean side.

* * * * *